United States Patent
Vyas et al.

(10) Patent No.: US 11,532,091 B2
(45) Date of Patent: Dec. 20, 2022

(54) GUIDED BACKPROPAGATION-GRADIENT UPDATING FOR IMAGE PROCESSING TASK USING REDUNDANT INFORMATION FROM IMAGE

(71) Applicant: Samsung Electronics Co., Ltd., Suwon-si (KR)

(72) Inventors: Kushal Kardam Vyas, Santa Clara, CA (US); Yingmao Li, Allen, TX (US); Chenchi Luo, Plano, TX (US); George Q. Chen, Plano, TX (US); Hamid R. Sheikh, Allen, TX (US); Youngjun Yoo, Plano, TX (US); Michael O. Polley, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 16/946,956

(22) Filed: Jul. 13, 2020

(65) Prior Publication Data
US 2022/0012903 A1    Jan. 13, 2022

(51) Int. Cl.
*G06T 7/00*    (2017.01)
*G06T 7/50*    (2017.01)
(Continued)

(52) U.S. Cl.
CPC ............... *G06T 7/50* (2017.01); *G06T 3/40* (2013.01); *G06T 5/001* (2013.01); *G06T 7/70* (2017.01);
(Continued)

(58) Field of Classification Search
CPC .. G06T 7/50; G06T 3/40; G06T 5/001; G06T 7/70; G06T 2207/20081; G06T 2207/20084
See application file for complete search history.

(56) References Cited

U.S. PATENT DOCUMENTS

2016/0063715 A1*  3/2016  Wan ..................... G06T 3/40
                                                  382/195
2018/0189937 A1*  7/2018  Bala .................... G06T 5/50
(Continued)

FOREIGN PATENT DOCUMENTS

WO    2020/000390 A1    1/2020

OTHER PUBLICATIONS

International Search Report and Written Opinion of the International Searching Authority in connection with International Patent Application No. PCT/KR2020/015394 dated Mar. 26, 2021, 9 pages.

(Continued)

*Primary Examiner* — Ping Y Hsieh

(57) ABSTRACT

A method includes obtaining, using at least one processor, an input image frame. The method also includes identifying, using the at least one processor, one or more regions of the input image frame containing redundant information. In addition, the method includes performing, using the at least one processor, an image processing task using the input image frame. The image processing task is guided based on the one or more identified regions of the input image frame. The method may further include obtaining, using the at least one processor, a coarse depth map associated with the input image frame. Performing the image processing task may include refining the coarse depth map to produce a refined depth map, where the refining of the coarse depth map is guided based on the one or more identified regions of the input image frame.

20 Claims, 10 Drawing Sheets

(51) Int. Cl.
  *G06T 3/40* (2006.01)
  *G06T 7/70* (2017.01)
  *G06T 5/00* (2006.01)
(52) U.S. Cl.
  CPC .............. *G06T 2207/20081* (2013.01); *G06T 2207/20084* (2013.01)

(56) References Cited

U.S. PATENT DOCUMENTS

| | | | |
|---|---|---|---|
| 2019/0362511 | A1 | 11/2019 | Jouppi et al. |
| 2020/0145642 | A1* | 5/2020 | Yu .......................... G06N 3/08 |
| 2020/0273192 | A1* | 8/2020 | Cheng .................... G06T 7/593 |
| 2020/0327685 | A1* | 10/2020 | Ren ...................... G06K 9/6267 |
| 2021/0049203 | A1* | 2/2021 | Gupta .................... G06F 16/56 |
| 2021/0358084 | A1* | 11/2021 | Bleyer ................. H04N 13/239 |

OTHER PUBLICATIONS

Dansereau et al., "Decoding, Calibration and Rectification for Lenselet-Based Plenoptic Cameras", Proceedings of the IEEE Conference on Computer Vision and Pattern Recognition (CVPR), 2013, 9 pages.

Mayer et al., "A Large Dataset to Train Convolutional Networks for Disparity, Optical Flow, and Scene Flow Estimation", Proceedings of the IEEE Conference on Computer Vision and Pattern Recognition (CVPR), 2016, 10 pages.

Barron et al., "The Fast Bilateral Solver," 14th European Conference on Computer Vision (ECCV), 2016, 50 pages.

Gonzalez et al., "Finding Correspondences for Optical Flow and Disparity Estimations using a Sub-pixel Convolution-based Encoder-Decoder Network," arXiv:1810.03155, Oct. 2018, 16 pages.

Gu et al., "Learning Dynamic Guidance for Depth Image Enhancement," 2017 IEEE Conference on Computer Vision and Pattern Recognition (CVPR), 2017, 10 pages.

He et al., "Guided Image Filtering," IEEE Transactions on Pattern Analysis and Machine Intelligence, vol. 35, No. 6, Jun. 2013, pp. 1397-1409.

Hui et al., "Depth Map Super-Resolution by Deep Multi-Scale Guidance," 14th European Conference on Computer Vision (ECCV), 2016, 17 pages.

Levoy, "Portrait mode on the Pixel 2 and Pixel 2 XL smartphones," Google AI Blog, Oct. 2017, 16 pages.

Wadhwa et al., "Synthetic Depth-of-Field with a Single-Camera Mobile Phone," ACM Trans. Graph., vol. 37, No. 4, Article 64, Aug. 2018, 18 pages.

Wikipedia, "Bokeh," Oct. 2018, 9 pages.

Wikipedia, "Nearest-neighbor interpolation," Feb. 2017, 2 pages.

Xu et al., "Depth-Aware Motion Deblurring," 2012 IEEE International Conference on Computational Photography (ICCP), 2012, 8 pages.

Yue et al., "High-Dimensional Camera Shake Removal With Given Depth Map," IEEE Transactions on Image Processing, vol. 23, No. 6, Jun. 2014, 16 pages.

Zhen et al., "Motion Deblurring and Depth Estimation from Multiple Images," 2016 IEEE International Conference on Image Processing (ICIP), 2016, 5 pages.

Zhou et al., "Stereo Magnification: Learning view synthesis using multiplane images," ACM Trans. Graph., vol. 37, No. 4, Article 65, Aug. 2018, 12 pages.

Wikipedia, "Cross entropy", Dec. 2019, 3 pages.

Vyas et al., "Super-Resolution Depth Map Generation for Multi-Camera or Other Environments", U.S. Appl. No. 16/811,585, filed Mar. 6, 2020, 46 pages.

* cited by examiner

602 ⌐ FIG. 6A
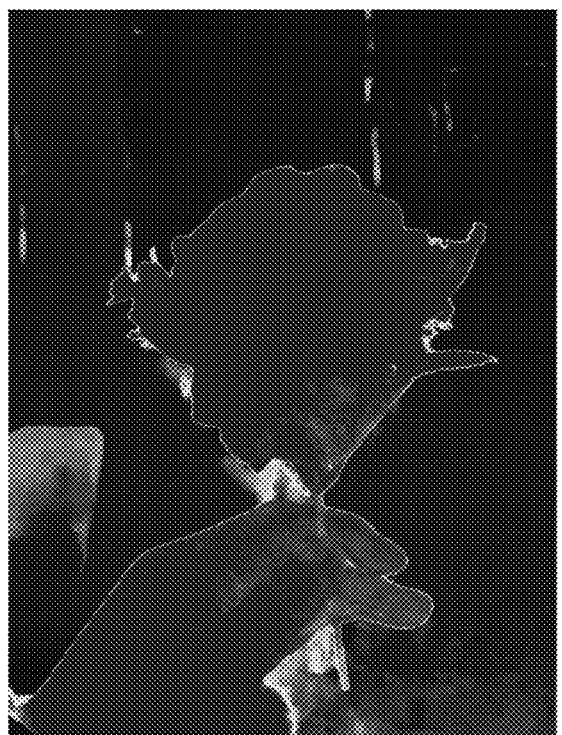
604 ⌐ FIG. 6B
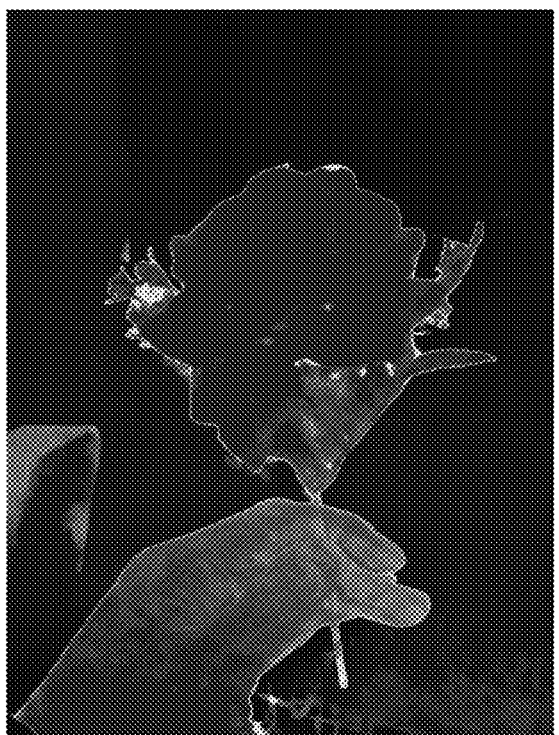
606 ⌐ FIG. 6C

GUIDED BACKPROPAGATION-GRADIENT UPDATING FOR IMAGE PROCESSING TASK USING REDUNDANT INFORMATION FROM IMAGE

TECHNICAL FIELD

This disclosure relates generally to imaging systems. More specifically, this disclosure relates to guided backpropagation-gradient updating for an image processing task using redundant information from an image.

BACKGROUND

Many mobile electronic devices, such as smartphones and tablet computers, include cameras that can be used to capture still and video images. In many of these mobile electronic devices, multiple types of image processing operations can be performed using captured images of scenes. Many image processing operations use input image frames as guidance for the image processing operations. This means that at least part of an image processing operation can be guided or directed based on certain contents of an input image frame.

SUMMARY

This disclosure provides guided backpropagation-gradient updating for an image processing task using redundant information from an image.

In a first embodiment, a method includes obtaining, using at least one processor, an input image frame. The method also includes identifying, using the at least one processor, one or more regions of the input image frame containing redundant information. In addition, the method includes performing, using the at least one processor, an image processing task using the input image frame. The image processing task is guided based on the one or more identified regions of the input image frame.

In a second embodiment, an apparatus includes at least one memory configured to store an input image frame. The apparatus also includes at least one processor configured to identify one or more regions of the input image frame containing redundant information and perform an image processing task using the input image frame and guidance based on the one or more identified regions of the input image frame.

In a third embodiment, a non-transitory computer readable medium contains instructions that when executed cause at least one processor to obtain an input image frame. The medium also contains instructions that when executed cause the at least one processor to identify one or more regions of the input image frame containing redundant information. The medium further contains instructions that when executed cause the at least one processor to perform an image processing task using the input image frame and guidance based on the one or more identified regions of the input image frame.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 6A, 6B, and 6C illustrate an example improvement in depth map refinement based on a consideration of total variance in the depth map refinement algorithm of FIG. 5 in accordance with this disclosure;

DETAILED DESCRIPTION

Figure 1:
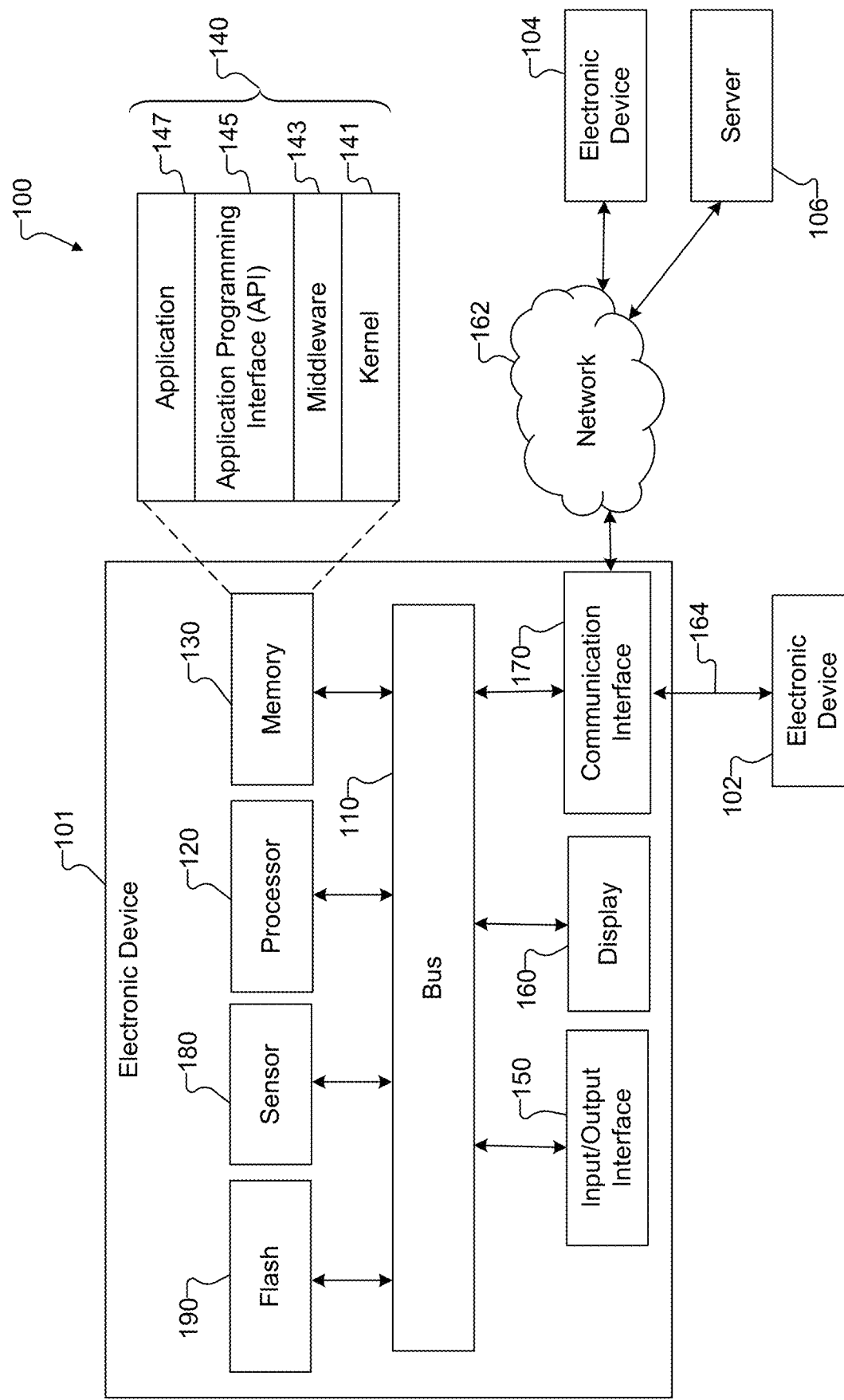
FIG. 1 illustrates an example network configuration including an electronic device in accordance with this disclosure.

FIGS. 1 through 10, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, many mobile electronic devices, such as smartphones and tablet computers, include cameras that can be used to capture still and video images. In many of these mobile electronic devices, multiple types of image processing operations can be performed using captured images of scenes. Many image processing operations (such as style transfer, image super-resolution, L0 filtering, and depth map refinement) use input image frames (such as red-green-blue or "RGB" image frames) as guidance for the image processing operations. However, an input image frame may routinely contain a large amount of redundant information relative to an image processing operation to be performed, which can slow the performance of the image processing operation or lead to the creation of image artifacts as a result of the image processing operation.

As a particular example of this, various image processing operations rely on relative depths of different pixels within a scene. For instance, "bokeh" refers to an effect that helps to improve the aesthetic quality of an image by blurring out-of-focus portions of the image (such as a background of the image) while keeping other portions of the image (such as a foreground or one or more subjects) in focus. In digital single-lens reflex (DSLR) cameras or other high-end cameras, bokeh is created optically in captured images due to the design and operation of the cameras and their associated lenses. However, in mobile electronic devices like smartphones and tablet computers, bokeh is typically created computationally rather than optically. For example, a mobile electronic device may estimate various depths in a scene within an image, and bokeh can be created by blurring pixels associated with larger depths more and blurring pixels associated with smaller depths less or not at all.

Depths in a scene are often identified and expressed using a depth map. A depth map is typically based on a captured image, where each pixel in the depth map corresponds to and identifies a depth associated with at least one pixel in the captured image. The depth map can be used to perform one or more image processing operations involving the captured image. However, the resolution of images that can be captured using electronic devices is increasing over time. Currently, images can be captured using electronic devices at "4K" resolutions, such as 3840×2160, or even higher. Computing a depth map directly from a high-resolution image is computationally expensive and time consuming. In some cases, it may not even be possible to compute a depth map directly from a high-resolution image, such as due to limitations in computing power or hardware in an electronic device. While it is possible to simply create a lower-resolution depth map and then upsample the lower-resolution depth map to generate a higher-resolution depth map, this approach typically loses quite a bit of detail related to depth in a scene. Also, while at least one technique has been proposed to reduce the computational time needed to produce high-resolution depth maps, some challenges may still remain. For example, it may be difficult for an image processing algorithm to distinguish (and therefore properly identify the depths of) objects with similar textures or patterns in a scene.

This disclosure provides various techniques for guided backpropagation-gradient updating for an image processing task using redundant information from an image. In these techniques, redundant information (at least with respect to a specified image processing task) in an image frame is identified using a trained neural network or other machine learning algorithm, and the specified image processing task can be performed using guidance from the machine learning algorithm. By identifying redundant information in an image frame being processed, the machine learning algorithm can help to simplify various image processing operations and/or reduce artifacts generated by the image processing operations. In some cases, these techniques can be used to generate more precise high-resolution depth maps or other refined depth maps for images of scenes, which can be useful in a number of image processing applications.

In this way, it is possible to significantly increase the accuracy of image processing operations and reduce the creation of artifacts in final generated images. When used to generate certain information like depth maps, this also enables various image processing operations to obtain more aesthetically-pleasing or accurate results. For example, the ability to obtain more accurate and more refined depth maps may allow improved bokeh effects or other effects to be generated in images of scenes.

Note that in the following discussion, the generation of a refined depth map is presented as an example of how the identification of redundant information in an image frame can be used. However, any other suitable results may be generated based at least partially on the identification of redundant information in an image frame. Also note that high-resolution or more-refined depth maps or other results that are based at least partially on the identification of redundant information in an image frame can be used to support various image processing applications, such as bokeh image generation, depth-aware deblurring, image relighting, augmented reality (AR), mixed reality (MR), visual simultaneous localization and mapping (SLAM), odometry, and animoji-related processes. However, results that are based at least partially on an identification of redundant information in an image frame can be used in any other suitable applications.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, a sensor 180, and a flash 190. In some embodiments, the electronic device 101 may exclude at least one of these components or may add at least one other component. The bus 110 includes a circuit for connecting the components 120-190 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain one or more input image frames, identify redundant information in at least one of the input image frames, and perform one or more image processing operations based at least partially on the identification of the redundant information.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain one or more input image frames, identify redundant information in at least one of the input image frames, and perform one or more image processing operations based at least partially on the identification of the redundant information. In some cases, this may include the generation or use of one or more high-resolution or more-refined depth maps based at least partially on the identification of the redundant information. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101. The one or more cameras or other imaging sensors 180 can optionally be used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 may execute one or more applications that, among other things, obtain one or more input image frames, identify redundant information in at least one of the input image frames, and perform one or more image processing operations based at least partially on the identification of the redundant information. In some cases, this may include the generation or use of one or more high-resolution or more-refined depth maps based at least partially on the identification of the redundant information.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

The following now describes various techniques for identifying redundant information in at least one input image frame and for using the identification of the redundant information, such as in the generation of high-resolution or more-refined depth maps. Note that the generation of a depth map may involve the use of multiple cameras or other imaging sensors 180 or a single camera or other imaging sensor 180. Thus, in some embodiments involving the generation of a depth map or other types of functions, multiple cameras or other imaging sensors 180 may be used to capture multiple input image frames (possibly simultaneously). In other embodiments involving the generation of a depth map or other types of functions, a single camera or other imaging sensor 180 may be used to capture multiple images in quick succession, where the imaging sensor 180 moves in between image captures. As a result, different input image frames described below may be captured by multiple cameras or other imaging sensors 180 or by a single camera or other imaging sensor 180. In either case, the input image frames are associated with different image planes, which refer to the planes of the imaging sensor or sensors 180 at the time or times when the input image frames are captured. The identification of redundant information may be performed using a single input image frame, regardless of how many image frames are used to perform an image processing operation (based at least partially on the identification of redundant information).

Figure 2:
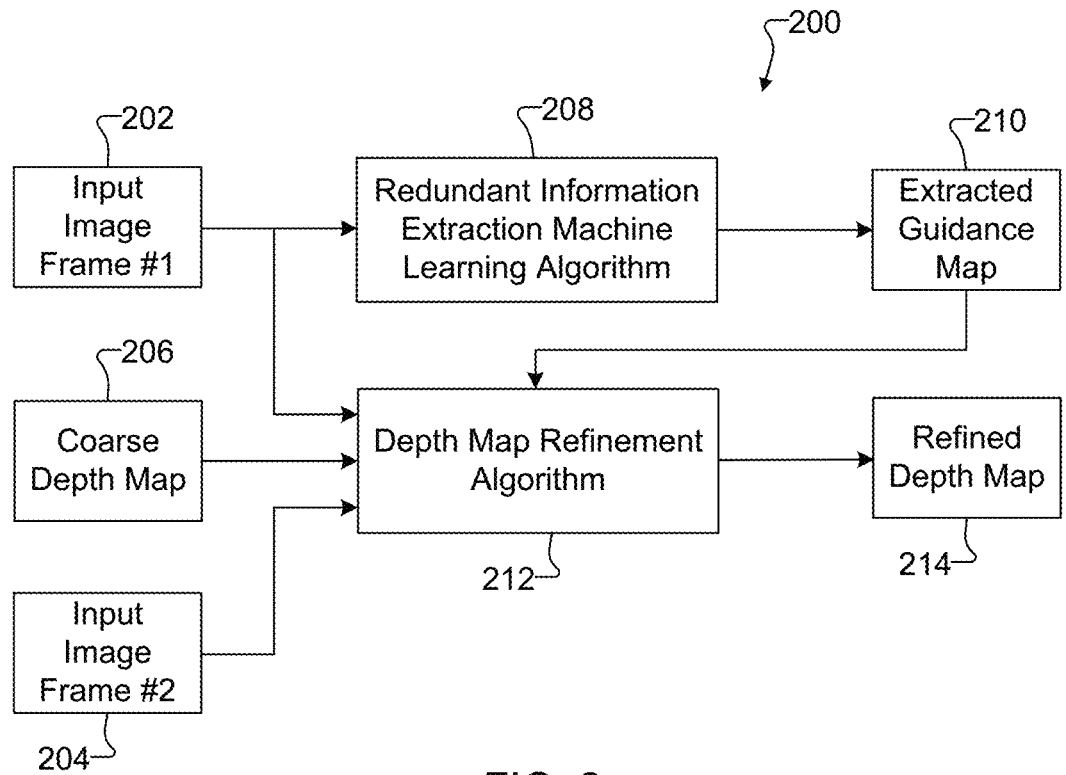
FIG. 2 illustrates an example technique for guided back-propagation-gradient updating for an image processing task using redundant information from an image in accordance with this disclosure.

FIG. 2 illustrates an example technique 200 for guided backpropagation-gradient updating for an image processing task using redundant information from an image in accordance with this disclosure. For ease of explanation, the technique 200 shown in FIG. 2 is described as involving the use of the electronic device 101 in the network configuration 100 of FIG. 1. However, the technique 200 shown in FIG. 2 could be used with any other suitable device and in any other suitable system.

As shown in FIG. 2, multiple input image frames, including first and second input image frames 202 and 204, are captured or otherwise obtained using the electronic device 101. The input image frames 202 and 204 could be captured simultaneously using different cameras or other imaging sensors 180 of the electronic device 101. As a particular example, the input image frames 202 and 204 may be captured simultaneously by a pair of stereo cameras or other stereo imaging sensors 180 of the electronic device 101. As noted above, however, the input image frames 202 and 204 may also be captured sequentially, such as with a single camera or other imaging sensor 180 that moves in between image captures. The input image frames 202 and 204 could be captured in response to a capture event, such as when the processor 120 detects a user initiating image capture by depressing a hard or soft button of the electronic device 101. The input image frames 202 and 204 may have any suitable resolution, such as a 4K resolution of 3840×2160 or higher (although lower resolutions may also be used). The resolution of the input image frames 202 and 204 can depend on the capabilities of the imaging sensor(s) 180 in the electronic device 101 and possibly on one or more user settings affecting the resolution. In some cases, the input image frames 202 and 204 may represent RGB image frames.

A coarse depth map 206 is also generated or otherwise obtained by the electronic device 101. The coarse depth map 206 represents an initial depth map of a scene captured in at least one of the input image frames 202 and 204. In some cases, the coarse depth map 206 has a lower resolution compared to the input image frames 202 and 204. As a particular example, if the input image frames 202 and 204 have a resolution of 3840×2160, the coarse depth map 206 may have a resolution of 960×540. The coarse depth map 206 can be generated in any suitable manner. In some embodiments, the coarse depth map 206 is generated using one of the input image frames 202 and 204. Various techniques for generating depth maps for an image are known in the art, and any of these techniques may be used here to generate the coarse depth map 206. Thus, this disclosure is not limited to any particular technique for generating the coarse depth map 206.

The input image frame 202 is provided to a redundant information extraction machine learning algorithm 208. The machine learning algorithm 208 operates to produce an extracted guidance map 210, which identifies at least one region of the input image frame 202 containing redundant information. The phrase "redundant information" refers to a collection of image-related information that is redundant in some respect related to an image processing operation to be performed. For example, in the context of generating a depth map, redundant information generally refers to a region or other collection of pixels associated with the same depth or a small range of similar depths within a scene. As a particular example in the context of generating a depth map, redundant information may refer to a texture or color of a coplanar object in an input image frame. Thus, the machine learning algorithm 208 can (among other things) operate to accurately identify different objects in similar depth planes within a scene, even when the objects have similar textures or colors. Note that pixels associated with the same depth or a small range of similar depths may be referred to as residing on a depth "plane" (although this is merely a term of art and does not require the pixels to actually be planar or reside on a completely flat planar surface). In other contexts, "redundant information" may refer to a region or other collection of pixels generally associated with some other common characteristic.

The machine learning algorithm 208 processes the input image frame 202 in order to identify the region(s) containing redundant information in the input image frame 202. For example, the machine learning algorithm 208 may identify one or more regions or other collections of pixels in the input image frame 202, where each region or other collection includes pixels that provide redundant information. The extracted guidance map 210 identifies the regions or other collections of pixels in the input image frame 202 that are associated with redundant information. The machine learning algorithm 208 represents a trained machine learning model that uses artificial intelligence (AI) or other form of machine learning to identify regions or other collections of pixels containing redundant information. The machine learning algorithm 208 may use any suitable machine learning model (now known or later developed), such as a neural network. One example implementation of the machine learning algorithm 208 is described below with reference to FIG. 3.

The input image frames 202 and 204, the coarse depth map 206, and the extracted guidance map 210 are provided to a depth map refinement algorithm 212, which processes this information to produce a refined depth map 214. The refined depth map 214 represents a depth map associated with at least one of the input image frames 202 and 204, and the refined depth map 214 can have a higher resolution or more detail compared to the coarse depth map 206. In some embodiments, for instance, the refined depth map 214 may have a resolution that matches the resolution of the input image frames 202 and 204. As a particular example, if the input image frames 202 and 204 have a resolution of 3840×2160, the refined depth map 214 may have a matching resolution of 3840×2160. In these types of embodiments, each pixel in the refined depth map 214 corresponds to and identifies a depth for a pixel in at least one of the input image frames 202 and 204.

The extracted guidance map 210 provides guidance to the depth map refinement algorithm 212 when generating the refined depth map 214 based on the input image frames 202 and 204 and the coarse depth map 206. For example, the extracted guidance map 210 may inform the depth map refinement algorithm 212 that a region of the input image frames 202 and 204 is associated with a single object, so the entire region should be at a common depth in the refined depth map 214. As a result, the depth map refinement algorithm 212 is able to generate the refined depth map 214 based on knowledge of which portions of the image frame(s) 202 and/or 204 might contain redundant information. This may facilitate more accurate generation of the refined depth map 214 and/or fewer artifacts in the refined depth map 214 or in an image produced using the refined depth map 214. One example implementation of the depth map refinement algorithm 212 is described below with reference to FIG. 5.

Note that in these approaches, guidance is treated as an intrinsic property of the input image frame 202, rather than a property of some type of filter operation. Also, rather than making guidance operate as a function of image intensity (at least when applied to depth map generation), guidance here can be independent of image intensity. Thus, an optimizer used in the depth map refinement algorithm 212 (as described below) is guided based on the extracted guidance map 210 to update gradients appropriately, meaning the optimizer is guided based on redundancy inside the image frame itself. As a result, similar regions of the image frame 202 can have similar gradient updates and similar final depth values in the refined depth map 214.

Although FIG. 2 illustrates one example of a technique 200 for guided backpropagation-gradient updating for an image processing task using redundant information from an image, various changes may be made to FIG. 2. For example, more than two input image frames may be received and processed. Also, the refined depth map 214 that is generated here may be used in any number of image processing applications.

Figure 3:
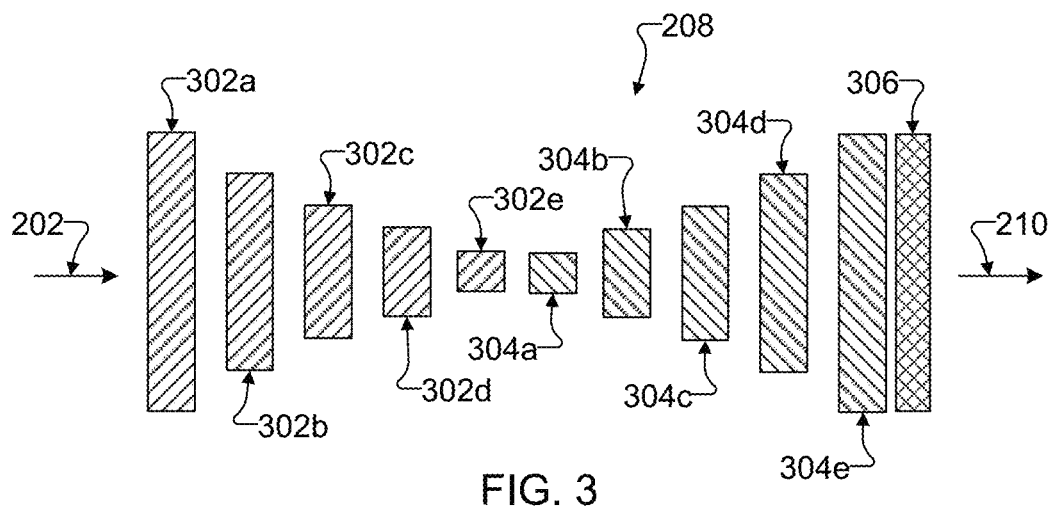
FIG. 3 illustrates an example redundant information extraction machine learning algorithm for use in the technique of FIG. 2 in accordance with this disclosure.

FIG. 3 illustrates an example redundant information extraction machine learning algorithm 208 for use in the technique of FIG. 2 in accordance with this disclosure. As shown in FIG. 3, the machine learning algorithm 208 receives the input image frame 202 and passes the input image frame 202 through a collection of convolutional layers 302a-302e. Each convolutional layer 302a-302e applies a convolution function to its inputs in order to generate its outputs. A convolutional layer 302a-302e generally represents a layer of convolutional neurons, which apply a convolution function that emulates the response of individual neurons to visual stimuli. Each neuron typically applies some function to its input values (often by weighting different input values differently) to generate output values. A convolutional layer 302a-302e may be associated with an activation function, which can apply a specific function or operation to the output values from the neurons to produce final outputs of the convolutional layer. In this example, the first convolutional layer 302a receives and processes the input image frame 202, and each of the remaining convolutional layers 302b-302e receives and processes the outputs from the prior convolutional layer 302a-302d. The output of each convolutional layer 302a-302e has a lower resolution than its input. The output of the last convolutional layer 302e represents an encoding of the input image frame 202.

Each convolutional layer 302a-302e can be configured with any suitable design parameters in order to encode the input image frame 202 as desired. In some embodiments, each convolutional layer 302a-302e may have a kernel or filter size of three. Also, in some embodiments, the convolutional layer 302a may have three input channels, thirty two output channels, and a stride of two; the convolutional layer 302b may have thirty two input channels, sixty four output channels, and a stride of two; the convolutional layer 302c may have sixty four input channels, one hundred and twenty eight output channels, and a stride of two; the convolutional layer 302d may have one hundred and twenty eight input channels, two hundred and fifty six output channels, and a stride of two; and the convolutional layer 302e may have two hundred and fifty six input channels, five hundred and twelve output channels, and a stride of one. Of course, these values are for illustration only. Note that while five convolutional layers 302a-302e are shown here, the machine learning algorithm 208 may support any suitable number of convolutional layers.

The machine learning algorithm 208 then passes the encoded version of the input image frame 202 through a collection of deconvolutional or upsampling layers 304a-304e. Each deconvolutional or upsampling layer 304a-304e applies a deconvolution or upsampling function to its inputs in order to generate its outputs. In this example, the first deconvolutional or upsampling layer 304a receives and processes the encoded version of the input image frame 202 provided by the convolutional layer 302e, and each of the remaining deconvolutional or upsampling layers 304b-304e receives and processes the outputs from the prior deconvolutional or upsampling layer 304a-304d. The output of the last deconvolutional or upsampling layer 304e represents a decoded version of the encoded input image frame 202 produced by the convolutional layers 302a-302e.

Each deconvolutional or upsampling layer 304a-304e can be configured with any suitable design parameters in order to properly decode the encoded input image frame 202. In some embodiments, each deconvolutional or upsampling layer 304a-304e may have a kernel or filter size of three. Also, in some embodiments, the deconvolutional or upsampling layer 304a may have five hundred and twelve input channels, five hundred and twelve output channels, and a stride of two; the deconvolutional or upsampling layer 304b may have five hundred and twelve input channels, two hundred and fifty six output channels, and a stride of two; the deconvolutional or upsampling layer 304c may have two hundred and fifty six input channels, one hundred and twenty eight output channels, and a stride of two; the deconvolutional or upsampling layer 304d may have one hundred and twenty eight input channels, sixty four output channels, and a stride of two; and the deconvolutional or upsampling layer 304e may have sixty four input channels, sixty four output channels, and a stride of one. Of course, these values once again are for illustration only. Note that while five deconvolutional or upsampling layers 304a-304e are shown here, the machine learning algorithm 208 may support any suitable number of deconvolutional or upsampling layers.

A softmax function layer 306 receives the decoded outputs representing the input image frame 202 from the deconvolutional or upsampling layer 304e. The softmax function layer 306 maps the decoded outputs (which are generally non-normalized values) to specified output classes (which are generally non-normalized values). Mathematically, the softmax function layer 306 can be said to map non-normalized outputs from the deconvolutional or upsampling layer 304e to a probability distribution over the specified output classes. Here, the output classes may refer to or represent different regions of the input image frame 202 containing redundant information. Thus, for instance, the output classes may include different objects at different depth planes in the input image frame 202, where each depth plane is associated with pixels having the same depth or a small range of similar depths (and which may represent the texture or color of a coplanar object in the input image frame 202).

By passing the input image frame 202 through the layers 302a-302e, 304a-304e, 306, the machine learning algorithm 208 can produce an extracted guidance map 210 for the input image frame 202. The extracted guidance map 210 here can generally identify one or more regions of the input image frame 202 that contain redundant information. The extracted guidance map 210 can then be used in any suitable manner, such as to guide the generation of a depth map or to guide the production of other image-related data.

Although FIG. 3 illustrates one example of the redundant information extraction machine learning algorithm 208 for use in the technique 200 of FIG. 2, various changes may be made to FIG. 3. For example, while shown as implementing a neural network, any other suitable machine learning algorithm may be used here to identify redundant information in input image frames.

Since the algorithm 208 described above is a machine learning algorithm, the algorithm 208 is trained prior to being placed into actual use analyzing input image frames. In order to train the machine learning algorithm 208, the machine learning algorithm 208 can be provided with training images and ground truths. Each training image may represent an actual or computer-generated image of a scene, and the ground truth associated with that training image identifies how the different regions of the training image should be identified by the machine learning algorithm 208 as containing redundant information. One example of this is shown in FIGS. 4A and 4B.

Figure 4A:
FIGS. 4A and 4B illustrate example training data for use in training the redundant information extraction machine learning algorithm of FIG. 3 in accordance with this disclosure.
Figure 4B:
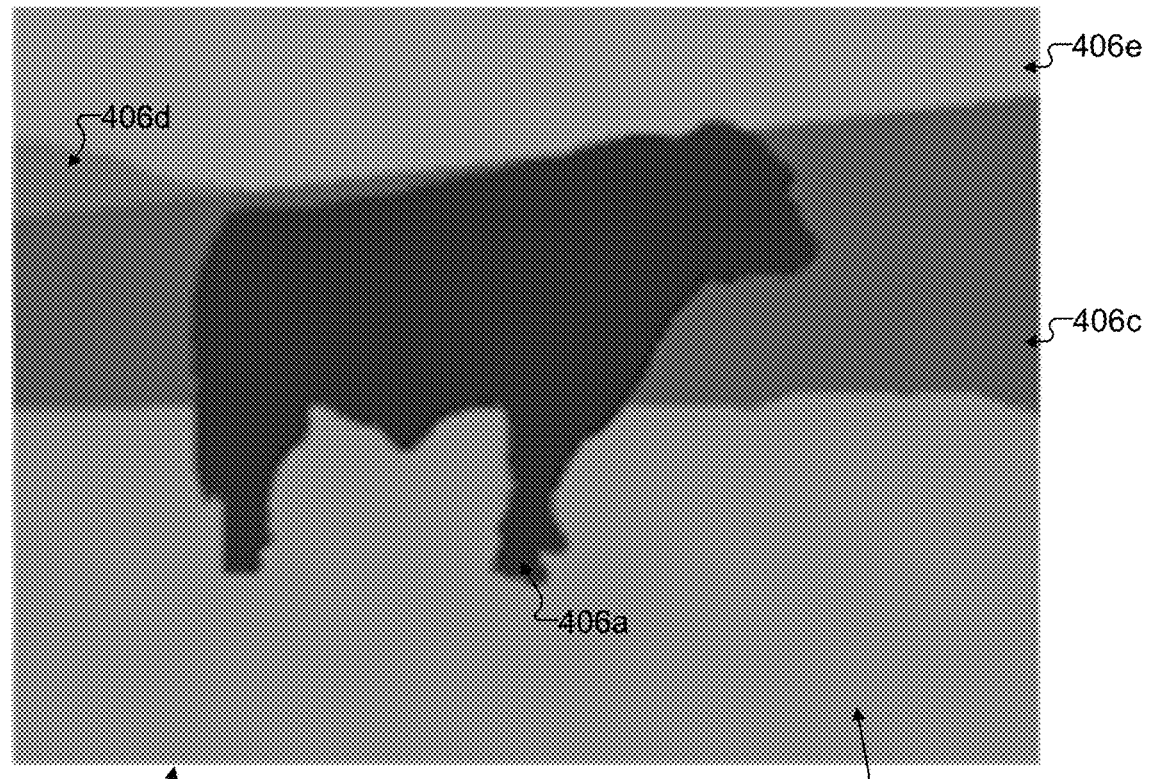

FIGS. 4A and 4B illustrate example training data for use in training the redundant information extraction machine learning algorithm 208 of FIG. 3 in accordance with this disclosure. As shown in FIG. 4A, a training image 402 represents an image of a scene, where the scene includes a subject (a cow in this example) standing in front of a fence. In the background of the image 402 are mountains and the sky. As shown in FIG. 4B, a ground truth map 404 identifies how the machine learning algorithm 208 should group the pixels of the training image 402 in order to identify various regions 406a-406e within the image 402 that contain redundant information. In this example, the region 406a is associated with the subject in the training image 402, and the region 406b is associated with the ground in the foreground of the training image 402. Also, the region 406c is associated with the fence in the training image 402, the region 406d is associated with the mountain in the training image 402, and the region 406e is associated with the sky in the training image 402. Each region 406a-406e contains or includes pixels having redundant information, such as where all pixels in each region 406a-406e lie on the same general depth plane in the scene.

In some embodiments, the training image 402 may be generated by a user using a camera or other electronic device, or the training image 402 may be computer-generated (possibly based on input from a user). Also, in some embodiments, the ground truth map 404 may be generated by a user manually labeling the regions of the training image 402, although other approaches for labeling may be used.

The machine learning algorithm 208 in FIG. 3 may be trained by providing a number of training images 402 to the machine learning algorithm 208 and comparing the extracted guidance maps 210 generated by the machine learning algorithm 208 to the ground truth maps 404 associated with the training images 402. The machine learning algorithm 208 can then be trained to minimize the cross-entropy between the extracted guidance maps 210 and the ground truth maps 404. If necessary, training may be performed over a number of iterations so that the machine learning algorithm 208 is eventually trained to correctly classify the regions of the training images 402 as shown by their ground truth maps 404 (at least to within some desired level of accuracy). Note, however, that any other suitable training approaches may be used to train the machine learning algorithm 208.

Although FIGS. 4A and 4B illustrate examples of training data for use in training the redundant information extraction machine learning algorithm 208 of FIG. 3, various changes may be made to FIGS. 4A and 4B. For example, the training image 402 and the ground truth map 404 shown here are merely examples of the types of information that might be used to train the machine learning algorithm 208.

Figure 5:
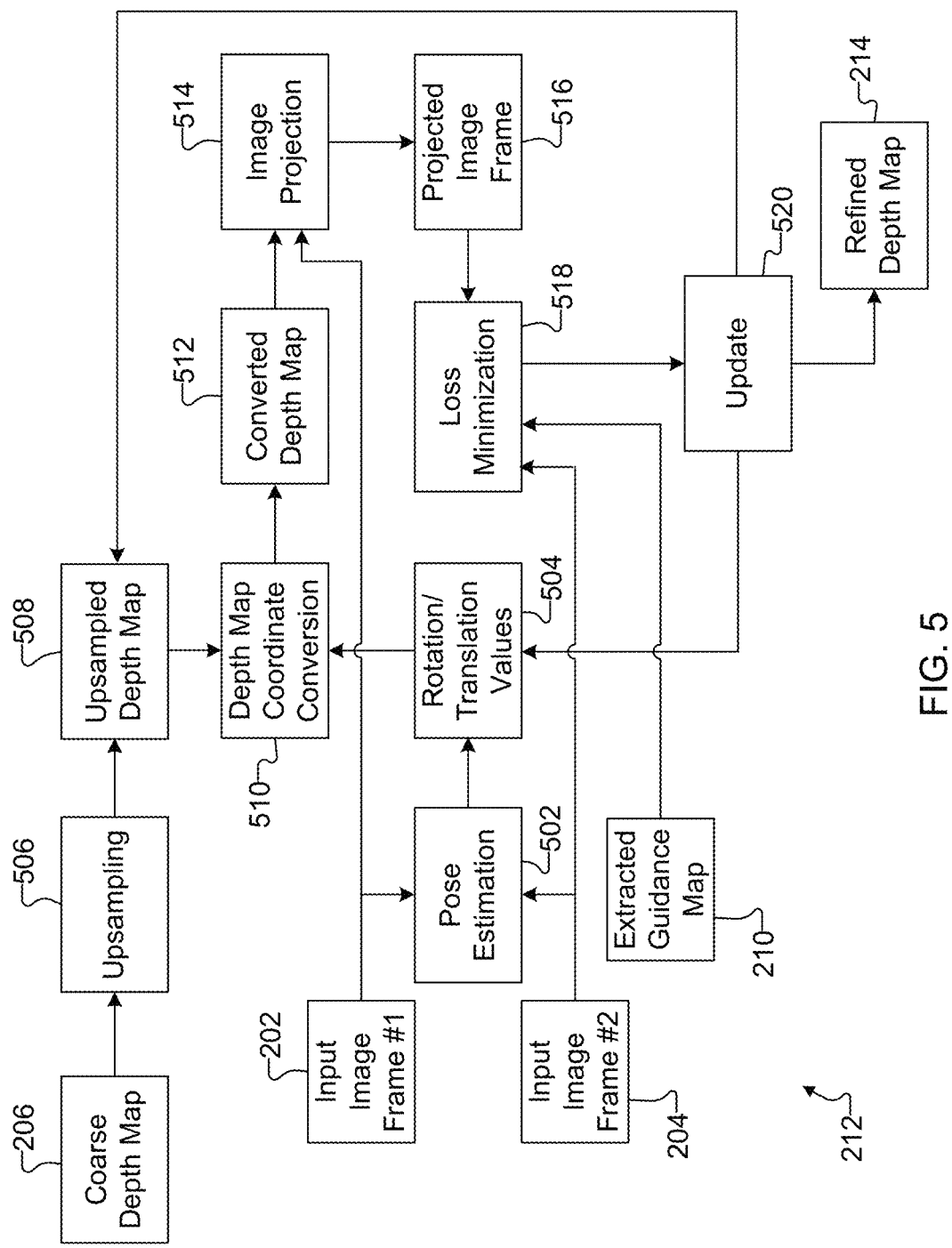
FIG. 5 illustrates an example depth map refinement algorithm for use in the technique of FIG. 2 in accordance with this disclosure.

FIG. 5 illustrates an example depth map refinement algorithm 212 for use in the technique 200 of FIG. 2 in accordance with this disclosure. As shown in FIG. 5, the depth map refinement algorithm 212 receives the input image frames 202 and 204 and performs a pose estimation function 502. The pose estimation function 502 operates to determine the differences in pose between the image planes used by the one or more cameras or other imaging sensors 180 when capturing the input image frames 202 and 204. The pose estimation function 502 generates information identifying a conversion from the image plane of the input image frame 202 to the image plane of the input image frame 204. Here, this information includes rotation and translation values 504, which define how the image planes for the input image frames 202 and 204 differ. For example, if the input image frames 202 and 204 are captured simultaneously by different cameras or other imaging sensors 180, the rotation and translation values 504 can be based on the different image planes of the imaging sensors 180 at the time of image capture. If the input image frames 202 and 204 are captured sequentially by a single camera or other imaging sensor 180, the rotation and translation values 504 can be based on the different image planes of the imaging sensor 180 at the different times of image capture. Translation generally refers to differences between image planes in specified directions, such as along first and second orthogonal axes. Rotation generally refers to differences between image planes rotationally about a third axis, which can be orthogonal to the first and second axes.

Various techniques are known in the art for identifying rotational and translational differences between image planes, such as structure from motion techniques. As a particular example, the processor 120 of the electronic device 101 may identify n pairs of sparse points in the input image frames 202 and 204, where n is at least eight. The sparse points can be expressed as $p_{1...n}^1$, $p_{1...n}^2$, where $p^1$ represents the first input image frame's sparse points and $p^2$ represents the second input image frame's sparse points. The processor 120 of the electronic device 101 may then calculate the rotation R and translation T values by solving $p^1[T] \times Rp^2 = 0$. Note that any suitable technique may be used here to perform pose estimation and generate rotation and translation values 504, and this disclosure is not limited to any particular technique for generating the rotation and translation values 504. The rotation and translation values 504 may be denoted as $R_1^2$ and $T_1^2$, respectively.

An upsampling function 506 receives the coarse depth map 206 and produces a higher-resolution or upsampled depth map 508. In some cases, the depth map 508 may have the same resolution as the input image frames 202 and 204, such as a 4K resolution or other resolution. However, because the depth map 508 is produced by upsampling the coarse depth map 206, the depth map 508 initially lacks fine detail compared to the input image frames 202 and 204. Various techniques are known in the art for upsampling image data, such as a nearest-neighbor upsampling technique. Note that any suitable technique may be used here to perform upsampling and generate an upsampled depth map 508, and this disclosure is not limited to any particular technique for generating the upsampled depth map 508. The depth map 508 may be denoted as $\hat{D}_1$. In some embodiments, the coarse depth map 206 may be generated using the input image frame 202, in which case the upsampled depth map 508 may be associated with or based on the input image frame 202 (and is therefore associated with the image plane used to capture the input image frame 202).

A depth map coordinate conversion function 510 receives the depth map 508 and the rotation and translation values 504. The depth map coordinate conversion function 510 generally operates to convert the depth map 508 from the coordinate frame of the input image frame 202 into the coordinate frame of the input image frame 204, thereby producing a converted depth map 512. In other words, the depth map coordinate conversion function 510 converts the depth map 508 from the image plane used to capture the input image frame 202 to the image plane used to capture the input image frame 204 based on the rotation and translation values 504. For example, the depth map coordinate conversion function 510 may identify a point cloud from the depth map 508, where the point cloud includes a large number of specified points in the depth map 508. The depth map coordinate conversion function 510 may apply the rotation and translation values 504 to the identified point cloud in order to identify corresponding points in the converted depth map 512. Note that any suitable number of points may be identified in the point cloud and processed using the rotation and translation values 504 to produce the converted depth map 512. The converted depth map 512 may be denoted as $\hat{D}_1^2$.

An image projection function 514 uses the converted depth map 512 to project the first input image frame 202 to the image plane associated with the second input image frame 204. For example, the image projection function 514 can use the converted depth map 512 to project the first input image frame 202 captured by one camera or other imaging sensor 180 to the image plane associated with another camera or other imaging sensor 180. As another example, the image projection function 514 can use the converted depth map 512 to project the first input image frame 202 captured by a camera or other imaging sensor 180 at one time to the image plane associated with the same camera or other imaging sensor 180 at a different time. The result of the image projection function 514 is a projected version of the input image frame 202, which is referred to as a projected image frame 516. The projected image frame 516 represents an estimate of what the first input image frame 202 might look like had the first input image frame 202 been captured at the image plane used to capture the second input image frame 204, which is based on the current version of the depth map 508. The projected image frame 516 may be denoted as $\hat{I}_2$.

At this point, the projected image frame 516 may be similar, but not an exact match, to the second input image frame 204. Among other things, this is due to the fact that the projected image frame 516 is generated using the initial depth map 508 and the initial rotation and translation values 504, which may be coarse values. In FIG. 5, the match between the second input image frame 204 and the projected image frame 516 is improved by iteratively making adjustments to the depth map 508 and/or the rotation and translation values 504, which is guided based on the output of the machine learning algorithm 208. Thus, in FIG. 5, the projected image frame 516, the second input image frame 204, and the extracted guidance map 210 are provided to a loss minimization function 518, which generally operates to minimize a loss function in order to update the depth map 508 and/or the rotation and translation values 504.

Any suitable loss function may be used here to help close the gap between the second input image frame 204 and the projected image frame 516. In some embodiments, the loss minimization function 518 uses a loss function that is based on a combination of three factors, namely (i) a measure of photometric loss between the second input image frame 204 and the projected image frame 516, (ii) a measure of total variance in the depth map 508, and (iii) a measure of errors between edges identified in the extracted guidance map 210 and edges identified in the depth map 508. Among other things, this helps to reduce or minimize gradients between the extracted guidance map 210 and the depth map 508. In particular embodiments, the loss minimization function 518 may use the following loss function:

$$\min_{\hat{D}_1, R_1^2, T_1^2} \left\| I_2 - \hat{I}_2(\hat{D}_1, R_1^2, T_1^2) \right\|_2 + Tv(\hat{D}_1) + \left\| \Delta M_1 - \Delta \hat{D}_1 \right\|_2 \quad (1)$$

Here, $I_2$ represents the second input image frame 204, and the projected image frame $\hat{I}_2$ is shown here as being a function of the depth map $\hat{D}_1$ and the rotation and translation values $R_1^2$ and $T_1^2$. Also, $\Delta M_1$ represents edges contained in the extracted guidance map 210, and $\Delta \hat{D}_1$ represents edges contained in the depth map 508. The expression $\|I_2 - \hat{I}_2(\hat{D}_1, R_1^2, T_1^2)\|_2$ here defines the photometric loss between the second input image frame 204 and the projected image frame 516. The expression $Tv(\hat{D}_1)$ here defines the total variance of the depth map $\hat{D}_1$. The expression $\|\Delta M_1 - \Delta \hat{D}_1\|_2$ here defines the error between the edges identified in the extracted guidance map 210 and the depth map 508.

An update function 520 can be used to update the depth map 508 and/or the rotation and translation values 504 based on the results of the loss minimization function 518, thereby feeding back an updated depth map 508 and/or updated rotation and translation values 504. The updated depth map 508 and/or the updated rotation and translation values 504 may then be used by the depth map coordinate conversion function 510 to generate another converted depth map 512, which can be used by the image projection function 514 to produce an updated projected image frame 516. The updated projected image frame 516 can be processed again by the loss minimization function 518, and additional updates to the depth map 508 and/or the rotation and translation values 504 may be made. This iterative process can continue until at least one specified condition is met, such as the measured loss being below a specified threshold value or a specified number of iterations being completed. In some cases, it may typically take between three and five iterations of this process for the measured loss to fall below the specified threshold value. Also, in some cases, the specified number of iterations may be based on the expected maximum number of iterations that might typically occur during use.

The iterations here help to refine the original version of the depth map 508 by adding additional details into the depth map 508 over multiple iterations. This essentially helps to recover lost details, since the original version of the depth map 508 is based on an upsampled coarse depth map 206 that lacks fine details. Moreover, this helps to correct for wrong depth values that might have been contained in the original depth map 206. Once the iterations end, the refined depth map 214 can be output, where the refined depth map 214 represents the final updated version of the depth map 508. In this example, the refined depth map 214 is shown as being output from the update function 520, although the refined depth map 214 may be provided by any other suitable component (such as a memory used to store the final updated version of the depth map 508).

The process shown here can produce a refined depth map 214 in significantly shorter amounts of time and using significantly fewer calculations compared to calculating the refined depth map 214 directly from a high-resolution input image frame 202 or 204. For example, using a direct approach from a 4K image frame, it may take approximately one billion multiply-accumulate operations over a period of about twelve seconds to generate a 4K depth map from the 4K image frame. Using the approach described above with respect to FIG. 5, it may take approximately one hundred million multiply-accumulate operations over less than two seconds to generate a refined depth map 214. For electronic devices like mobile smartphones and tablet computers, this reduction in time can be very significant, especially in terms of user satisfaction.

Although FIG. 5 illustrates one example of a depth map refinement algorithm 212 for use in the technique 200 of FIG. 2, various changes may be made to FIG. 5. For example, more than two input image frames may be received and processed. Also, the refined depth map 214 that is generated here may be used in any number of image processing applications.

FIGS. 6A, 6B, and 6C illustrate an example improvement in depth map refinement based on a consideration of total variance in the depth map refinement algorithm 212 of FIG. 5 in accordance with this disclosure. As noted above, in some embodiments, the loss minimization function 518 uses a loss function that is based on (among other things) a measure of total variance in the depth map 508. One example benefit of reducing or minimizing total variance is to make the final result "smoother" and less "noisy."

Consider the following example that illustrates this. FIG. 6A illustrates an example input image frame 602 that may be processed by the depth map refinement algorithm 212. FIG. 6B illustrates an example refined depth map 604 that could be generated by the depth map refinement algorithm 212 without considering total variance in the depth map 508, and FIG. 6C illustrates an example refined depth map 606 that could be generated by the depth map refinement algorithm 212 while considering total variance in the depth map 508. As can be seen here, the refined depth map 606 may provide improved results compared to the refined depth map 604, which is particularly noticeable in the background of the scene. In FIG. 6B, the refined depth map 604 is not particularly smooth due to the presence of various objects in the background. In FIG. 6C, the refined depth map 606 provides smoother results in the background.

Although FIGS. 6A, 6B, and 6C illustrate one example of an improvement in depth map refinement based on a consideration of total variance in the depth map refinement algorithm 212 of FIG. 5, various changes may be made to FIGS. 6A, 6B, and 6C. For example, FIGS. 6A, 6B, and 6C are merely meant to illustrate one example of the type of benefit that could be obtained by considering total variance in the loss function used by the loss minimization function 518. Obviously, images of scenes can vary widely, and the results obtained using the approaches described in this patent document can also vary widely depending on the circumstances.

It should be noted that the operations described above can be implemented in an electronic device 101, 102, 104, server 106, or other device in any suitable manner. For example, in some embodiments, the operations described above can be implemented or supported using one or more software applications or other software instructions that are executed by at least one processor 120 of a device. In other embodiments, at least some of the operations described above can be implemented or supported using dedicated hardware components. In general, the operations described above can be performed using any suitable hardware or any suitable combination of hardware and software/firmware instructions.

It should also be noted that the operations described above are described as being performed using a specific implementation of the electronic device 101, but a number of modifications can be made based on the device being used. For example, while the electronic device 101 may be described above as performing various operations using RGB image frames, image data in other domains (such as Bayer or YUV data) could also be used or processed. As another example, the techniques described in this patent document could be combined with any other suitable image processing functionality in order to perform desired processing of still image data, video image data, or other data.

The functionality for identifying redundant information (and possibly generating refined depth maps) may be used in any suitable applications. While the following examples describe various ways in which these functions may be used, redundant information and/or refined depth maps may be used in any other suitable manner. As one example, a refined depth map may be generated and used to create the bokeh effect in a captured image frame. Here, a processor 120 may apply different amounts of blurring to different pixels in the captured image frame, where the different amounts of blurring depend at least partially on the identified depths in the refined depth map (typically where more blurring is applied to larger depths and less/no blurring is applied to smaller depths). The ability to obtain a refined depth map can help the blurring to be applied more accurately in an image frame, enabling more accurate bokeh in the final image of a scene.

As another example, a refined depth map may be generated and used to support depth-aware deblurring. Here, multiple shorter-exposure image frames (with little or no motion blur) and a longer-exposure image frame (with more motion blur) may be captured, and a refined depth map may be generated using at least one of the shorter-exposure image frames. Depth-aware motion blur removal can then be performed using the refined depth map and the longer-exposure image frame, such as by using spatially-varying point spread functions associated with different portions of the longer-exposure image frame having different depths. The ability to obtain a refined depth map can help the depth-aware deblurring to be applied more accurately, enabling more accurate deblurring in the final image of a scene.

As yet another example, a refined depth map may be generated and used to support image relighting. Here, a refined depth map can be generated for an image frame, and the refined depth map can be used to control how lighting in the image frame is modified in the foreground and in the background. The ability to obtain a refined depth map can help the relighting to be applied more accurately, enabling more accurate relighting of the foreground and background in the final image of a scene. As still other examples, various functions involving AR/MR, visual SLAM, odometry, or animoji-related processes may be based on depth in a scene and can benefit from the use of accurate refined depth maps.

Figure 7A:
FIGS. 7A, 7B, 7C, and 7D illustrate example results that may be obtained using the technique of FIG. 2 in accordance with this disclosure.
Figure 7B:

FIGS. 7A, 7B, 7C, and 7D illustrate example results that may be obtained using the technique 200 of FIG. 2 in accordance with this disclosure. In FIG. 7A, an input image frame 702 of a scene is shown. Here, the input image frame 702 shows a street with various vehicles lining the street, as well as buildings, trees, and a portion of the sky. In FIG. 7B, a coarse depth map 704 is shown for the same scene and may be generated based on at least the input image frame 702. As can be seen here, the coarse depth map 704 lacks quite a few details related to the contents of the scene. As noted above, the coarse depth map 704 may be generated using any number of techniques.

Figure 7C:
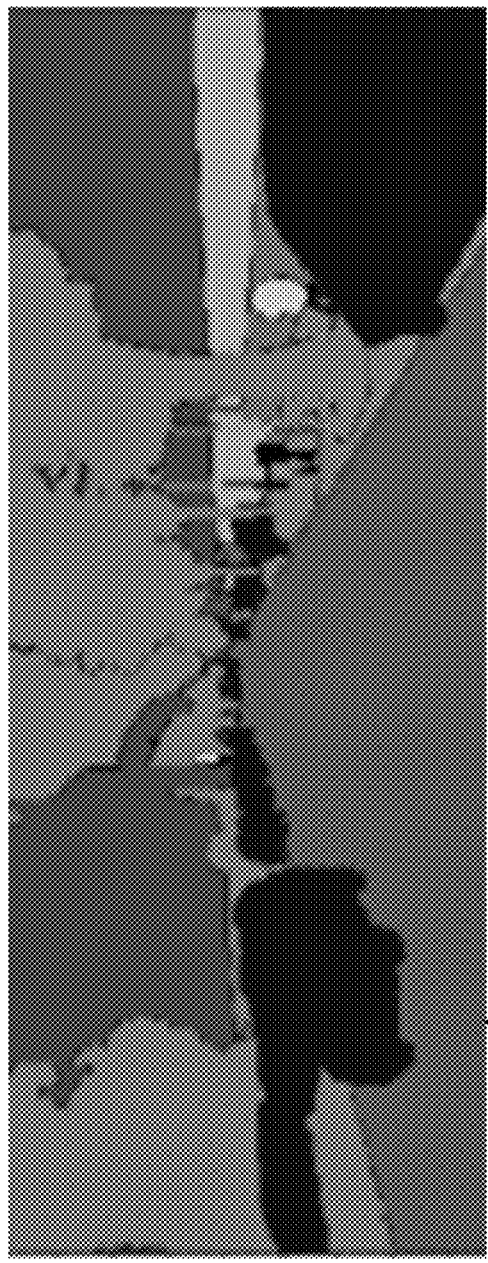
Figure 7D:
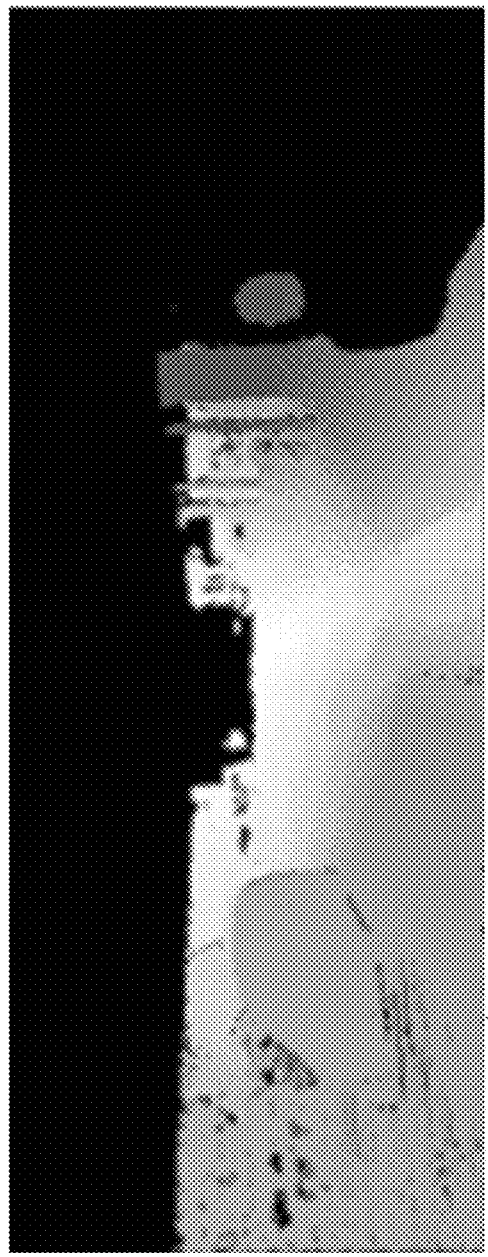

The input image frame 702 is provided to the machine learning algorithm 208, which analyzes the input image frame 702 and produces an extracted guidance map 706 as shown in FIG. 7C. Here, the extracted guidance map 706 identifies various regions of the input image frame 702 that contain redundant information, such as redundant textures or colors. Among other things, the extracted guidance map 706 identifies regions associated with different objects in the scene. The extracted guidance map 706 can then be used by the depth map refinement algorithm 212 (along with the input image frame 702 and another input image frame) to produce a refined depth map 708, which is shown in FIG. 7D. Compared to the depth map 704, the refined depth map 708 provides significantly improved detail regarding depths within the scene.

Figure 8A:
FIGS. 8A, 8B, 8C, and 8D illustrate other example results that may be obtained using the technique of FIG. 2 in accordance with this disclosure.
Figure 8B:
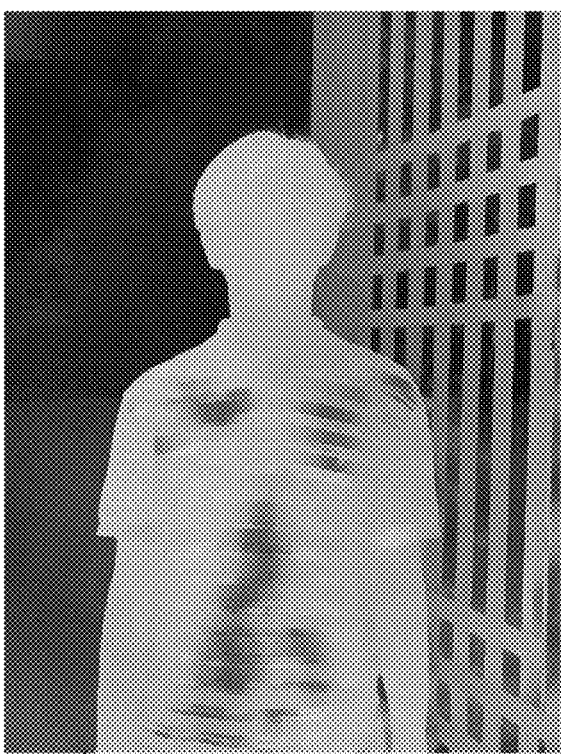

FIGS. 8A, 8B, 8C, and 8D illustrate other example results that may be obtained using the technique 200 of FIG. 2 in accordance with this disclosure. In FIG. 8A, an input image frame 802 represents an image of a person (whose face is obscured for privacy), where the person is wearing a striped shirt and is standing next to a fence or lattice. As noted above, this is one type of situation where image algorithms have difficulty distinguishing (and therefore properly identifying the depths of) objects in a scene, since the objects have similar textures or patterns. FIG. 8B illustrates an example coarse depth map 804 of the same scene. It can be seen that the coarse depth map 804 does not accurately identify the depth of the person in the image frame 802 due to this problem.

Figure 8C:
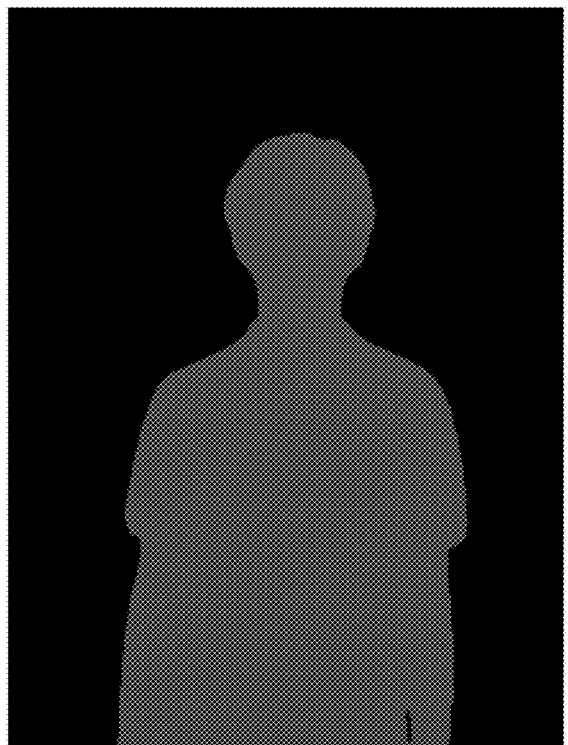
Figure 8D:
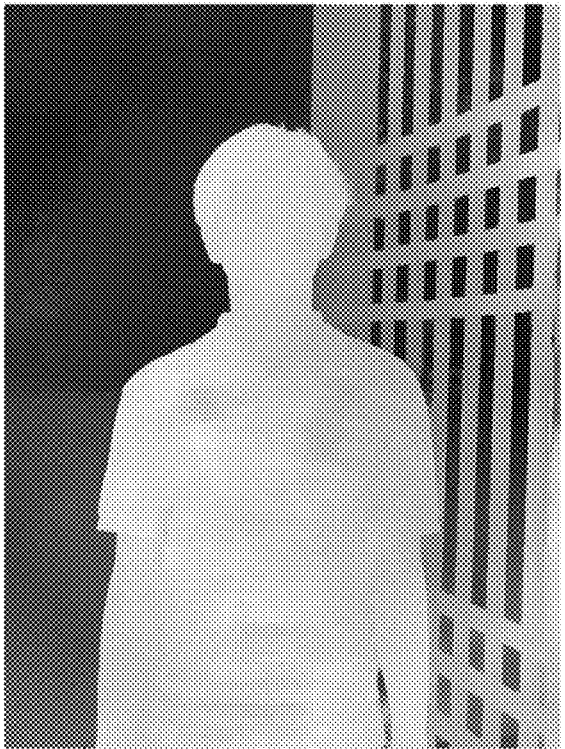

Using the approaches described above, the input image frame 802 can be processed by the machine learning algorithm 208 to produce an extracted guidance map 806 as shown in FIG. 8C. The extracted guidance map 806 here indicates that the person in the image frame 802 should have a uniform depth, so the region of the image frame 802 containing the person is identified as having redundant information. The depth map refinement algorithm 212 may use the extracted guidance map 806, along with the input image frame 802 and another image frame, to produce a refined depth map 808 as shown in FIG. 8D. As can be seen here, the refined depth map 808 provides much improved depth information regarding the person in the input image frame 802 compared to the depth map 804.

Thus, FIGS. 8A, 8B, 8C, and 8D here illustrate a common challenge for many stereo algorithms, such as baseline-oriented patterns. That is, the striped pattern on the person's shirt is generally parallel to the image sensor baseline, so it is often difficult for a conventional stereo vision algorithm to properly identify the image disparity across the person's shirt because of this. This type of problem can happen quite often during normal use of electronic devices. By introducing the concept of redundant information identification and guidance, the depth map refinement algorithm 212 "understands" that the entire person represents a single object, so the disparity across the entire region of the person should be estimated substantially evenly. Thus, introducing the consideration of redundant information helps to overcome these kinds of challenges.

Although FIGS. 7A, 7B, 7C, 7D, 8A, 8B, 8C, and 8D illustrate examples of results that may be obtained using the technique 200 of FIG. 2, various changes may be made to these figures. For example, these figures are merely meant to illustrate examples of the types of results that could be obtained using the approaches described in this disclosure. Obviously, images of scenes can vary widely, and the results obtained using the approaches described in this patent document can also vary widely depending on the circumstances.

Figure 9:
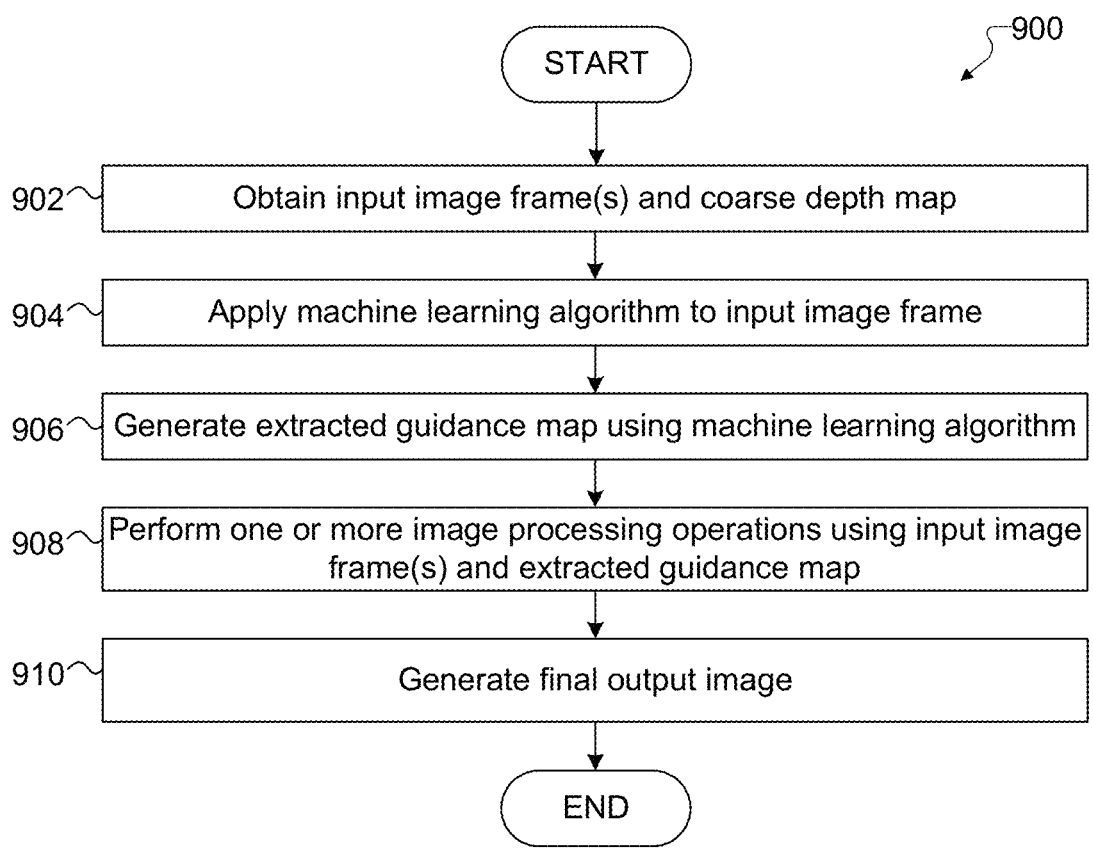
FIG. 9 illustrates an example method for guided backpropagation-gradient updating for an image processing task using redundant information from an image in accordance with this disclosure.

FIG. 9 illustrates an example method 900 for guided backpropagation-gradient updating for an image processing task using redundant information from an image in accordance with this disclosure. For ease of explanation, the method 900 shown in FIG. 9 is described as involving the use of the electronic device 101 in the network configuration 100 of FIG. 1, where the electronic device 101 can support the technique 200 of FIG. 2. However, the method 900 shown in FIG. 9 could be used with any other suitable device and in any other suitable system.

As shown in FIG. 9, at least one input image frame and a coarse depth map are generated or otherwise obtained at step 902. This may include, for example, the processor 120 of the electronic device 101 obtaining one or more input image frames 202, 204 from one or more cameras or other imaging sensors 180. Multiple input image frames 202, 204 may be obtained in various ways, such as simultaneously using multiple cameras or other imaging sensors 180 or sequentially using a single camera or other imaging sensor 180. This may also include the processor 120 of the electronic device 101 generating a coarse depth map 206, which may be based on one of the input image frame(s) 202, 204.

A machine learning algorithm is applied to at least one input image frame at step 904, and an extracted guidance map is generated using the machine learning algorithm at step 906. This may include, for example, the processor 120 of the electronic device 101 passing the input image frame 202 through a neural network of the machine learning algorithm 208 to generate an extracted guidance map 210. As a particular example, this may include the processor 120 of the electronic device 101 passing the input image frame 202 through the layers 302a-302e, 304a-304e, 306 of the machine learning algorithm 208 to generate the extracted guidance map 210.

One or more image processing operations are performed using the at least one input image frame and the extracted guidance map at step 908. This may include, for example, the processor 120 of the electronic device 101 performing the image processing operation(s) using the at least one input image frame 202, 204 while being guided by the extracted guidance map 210. As a particular example, this may include the processor 120 of the electronic device 101 generating a refined depth map 214 using the input image frames 202, 204 and the coarse depth map 206 while being guided by the extracted guidance map 210.

The results of the image processing operation(s) may be used in any suitable manner. In this example, the results of the image processing operation(s) are used to produce at least one final image of a scene at step 910. This may include, for example, the processor 120 of the electronic device 101 using the refined depth map 214 to produce the bokeh effect, perform depth-aware deblurring, or perform image relighting to generate a final image of a scene. Of course, other functions may also be used here, such as AR/MR, visual SLAM, odometry, or animoji-related functions.

Although FIG. 9 illustrates one example of a method 900 for guided backpropagation-gradient updating for an image processing task using redundant information from an image, various changes may be made to FIG. 9. For example, while shown as a series of steps, various steps in FIG. 9 may overlap, occur in parallel, occur in a different order, or occur any number of times.

Figure 10:
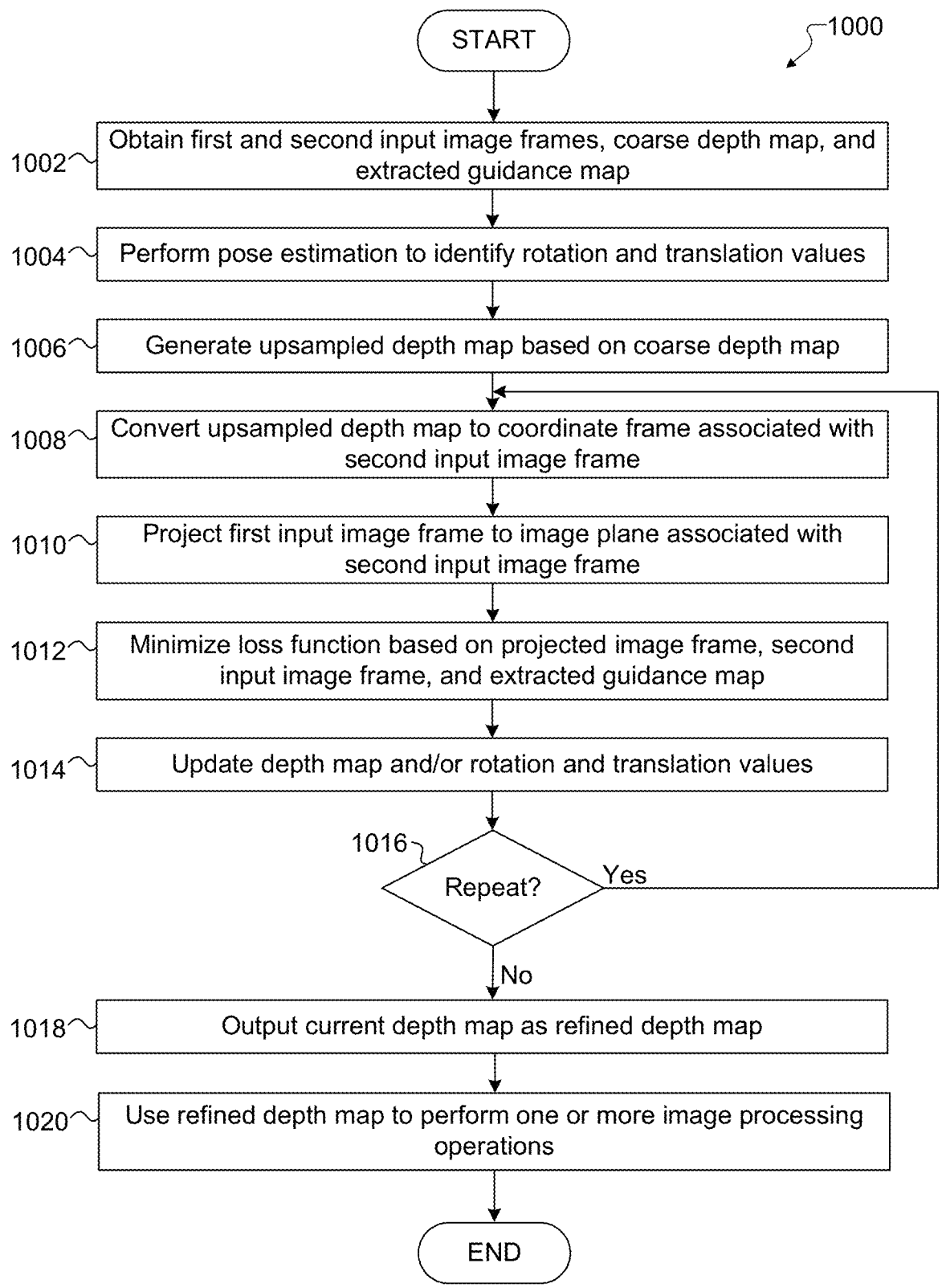
FIG. 10 illustrates an example method for depth map generation based on redundant information from an image in accordance with this disclosure.

FIG. 10 illustrates an example method 1000 for depth map generation based on redundant information from an image in accordance with this disclosure. For ease of explanation, the method 1000 shown in FIG. 10 is described as involving the use of the electronic device 101 in the network configuration 100 of FIG. 1, where the electronic device 101 can support the technique 200 of FIG. 2. However, the method 1000 shown in FIG. 10 could be used with any other suitable device and in any other suitable system.

As shown in FIG. 10, first and second input image frames, a coarse depth map, and an extracted guidance map are generated or otherwise obtained at step 1002. This may include, for example, the processor 120 of the electronic device 101 performing the operations described above with reference to steps 902, 904, and 906 in FIG. 9. Pose estimation is performed to identify rotation and translation values associated with the first and second input image frames at step 1004. This may include, for example, the processor 120 of the electronic device 101 performing the pose estimation function 502 to generate rotation and translation values 504, which define how the image planes for the input image frames 202, 204 differ. An upsampled depth map associated with the first input image frame is generated at step 1006. This may include, for example, the processor 120 of the electronic device 101 upsampling the coarse depth map 206 to produce an initial higher-resolution depth map 508.

The upsampled depth map is converted from the coordinate frame associated with the first input image frame to the coordinate frame associated with the second input image frame at step 1008. This may include, for example, the processor 120 of the electronic device 101 identifying a point cloud from the depth map 508, where the point cloud includes a large number of points in the depth map 508. This may also include the processor 120 of the electronic device 101 applying the current rotation and translation values 504 to the identified point cloud in order to identify corresponding points in a converted depth map 512. The first input image frame is projected from an image plane associated with the first input image frame to an image plane associated with the second input image frame at step 1010. This may include, for example, the processor 120 of the electronic device 101 projecting the first input image frame 202 to the image plane associated with the second input image frame 204 using the converted depth map 512 to produce a projected image frame 516.

A loss function is minimized based on the projected image frame, the second input image frame, and the extracted guidance map at step 1012, and one or more updates are made to the current depth map and/or the current rotation and translation values at step 1014. This may include, for example, the processor 120 of the electronic device 101 using a loss function that is based on a combination of (i) a measure of photometric loss between the second input image frame 204 and the projected image frame 516, (ii) a measure of total variance in the current depth map 508, and (iii) a measure of errors between edges identified in the extracted guidance map 210 and edges identified in the current depth map 508. One specific example of a loss function is shown in Equation (1) above, although other loss functions may be used here. This may also include the processor 120 of the electronic device 101 updating the current depth map 508 and/or the current rotation and translation values 504 based on the results of the loss minimization.

If further updating is to occur at step 1016, the process returns to step 1008 to repeat the conversion, projection, loss minimization, and update steps based on the updated depth map and/or the updated rotation and translation values. Note that step 1016 here may or may not involve an active determination of whether to repeat an iteration. For example, in some cases, another iteration may occur if the measured loss is not below a specified threshold value or a specified number of iterations have not yet been completed. Also note that the conversion, projection, loss minimization, and update steps may occur only once if the generated depth map satisfies the specified threshold value.

At some point, the conversion, projection, loss minimization, and update steps end, and the current depth map is output as a refined depth map at step 1018. This may include, for example, the processor 120 of the electronic device 101 outputting the current depth map as the refined depth map 214. Ideally, the refined depth map 214 is more accurate and contains more detail compared to the initial depth map 508. Also, the refined depth map 214 can be produced using significantly fewer calculations and in significantly shorter time. The refined depth map may then be used in any suitable manner, such as to perform one or more image processing operations at step 1020. This may include, for example, the processor 120 of the electronic device 101 or some other component using the refined depth map 214 to perform one or more functions, such as bokeh image generation, depth-aware deblurring, image relighting, AR/MR, visual SLAM, odometry, or animoji-related processes.

Although FIG. 10 illustrates one example of a method 1000 for depth map generation based on redundant information from an image, various changes may be made to FIG. 10. For example, while shown as a series of steps, various steps in FIG. 10 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
obtaining, using at least one processor, an input image frame and a coarse depth map associated with the input image frame, the coarse depth map having a first resolution;
identifying, using the at least one processor, regions of the input image frame containing redundant information; and
performing, using the at least one processor, an image processing task using the input image frame, the image processing task guided based on the identified regions of the input image frame;
wherein different ones of the identified regions of the input image frame are associated with different depths or depth ranges within a scene; and
wherein the image processing task comprises generating, based on the identified regions of the input image frame, a refined depth map having a second resolution higher than the first resolution.

2. The method of claim 1, wherein the input image frame has the second resolution.

3. The method of claim 1, wherein:
identifying the regions of the input image frame comprises generating an extracted guidance map that identifies the regions of the input image frame; and
generating the refined depth map comprises minimizing a loss function based on the extracted guidance map.

4. The method of claim 1, wherein:
identifying the regions of the input image frame comprises identifying the regions of the input image frame using a trained machine learning algorithm; and
the trained machine learning algorithm is trained using training images and associated ground truth maps, the ground truth maps identifying different regions containing redundant information in the training images.

5. A method comprising:
obtaining, using at least one processor, a first input image frame associated with a first image plane, a second input image frame associated with a second image plane, and a coarse depth map associated with at least one of the first and second input image frames;
identifying, using the at least one processor, one or more regions of the first or second input image frame containing redundant information; and
performing, using the at least one processor, an image processing task using the first and second input image frames, the image processing task guided based on the one or more identified regions of the first or second input image frame;
wherein performing the image processing task comprises:
upsampling, using the at least one processor, the coarse depth map to produce an upsampled depth map; and
refining the upsampled depth map to produce a refined depth map, the refining of the upsampled depth map guided based on the one or more identified regions of the first or second input image frame; and
wherein refining the upsampled depth map to produce the refined depth map comprises:
projecting, using the at least one processor, the first input image frame to the second image plane in order to produce a projected image frame using (i) the upsampled depth map and (ii) rotation and translation information identifying a conversion from the first image plane to the second image plane; and adjusting, using the at least one processor, at least one of the upsampled depth map and the rotation and translation information.

6. The method of claim 5, wherein projecting the first input image frame to the second image plane comprises:
converting the upsampled depth map from a coordinate frame associated with the first image plane to a coordinate frame associated with the second image plane using the rotation and translation information in order to produce a converted depth map; and
projecting the first input image frame to the second image plane using the converted depth map.

7. The method of claim 5, wherein adjusting at least one of the upsampled depth map and the rotation and translation information comprises:
minimizing a loss function based on (i) a measure of photometric loss between the second input image frame and the projected image frame, (ii) a measure of total variance in the upsampled depth map, and (iii) a measure of errors between edges in an extracted guidance map that identifies the one or more regions of the first or second input image frame and edges identified in the upsampled depth map.

8. An apparatus comprising:
at least one memory configured to store an input image frame and a coarse depth map associated with the input image frame, the coarse depth map having a first resolution; and
at least one processor configured to:
identify regions of the input image frame containing redundant information; and
perform an image processing task using the input image frame and guidance based on the identified regions of the input image frame;
wherein different ones of the identified regions of the input image frame are associated with different depths or depth ranges within a scene; and
wherein, to perform the image processing task, the at least one processor is configured to generate, based on the identified regions of the input image frame, a refined depth map having a second resolution higher than the first resolution.

9. The apparatus of claim 8, wherein the input image frame has the second resolution.

10. The apparatus of claim 8, wherein:
to identify the regions of the input image frame, the at least one processor is configured to generate an extracted guidance map that identifies the regions of the input image frame; and
to generate the refined depth map, the at least one processor is configured to minimize a loss function based on the extracted guidance map.

11. The apparatus of claim 8, wherein:
the at least one processor is configured to identify the regions of the input image frame using a trained machine learning algorithm; and
the trained machine learning algorithm is trained using training images and associated ground truth maps, the ground truth maps identifying different regions containing redundant information in the training images.

12. An apparatus comprising:
at least one memory configured to store a first input image frame associated with a first image plane, a second input image frame associated with a second image plane, and a coarse depth map associated with at least one of the first and second input image frames; and
at least one processor configured to:
identify one or more regions of the first or second input image frame containing redundant information; and
perform an image processing task using the first and second input image frames and guidance based on the one or more identified regions of the first or second input image frame;
wherein, to perform the image processing task, the at least one processor is configured to:
upsample the coarse depth map to produce an upsampled depth map; and
refine the upsampled depth map with the guidance based on the one or more identified regions of the first or second input image frame to produce a refined depth map; and
wherein, to refine the upsampled depth map to produce the refined depth map, the at least one processor is configured to:
project the first input image frame to the second image plane in order to produce a projected image frame using (i) the upsampled depth map and (ii) rotation and translation information identifying a conversion from the first image plane to the second image plane; and
adjust at least one of the upsampled depth map and the rotation and translation information.

13. The apparatus of claim 12, wherein, to project the first input image frame to the second image plane, the at least one processor is configured to:
convert the upsampled depth map from a coordinate frame associated with the first image plane to a coordinate frame associated with the second image plane using the rotation and translation information in order to produce a converted depth map; and
project the first input image frame to the second image plane using the converted depth map.

14. The apparatus of claim 12, wherein, to adjust at least one of the upsampled depth map and the rotation and translation information, the at least one processor is configured to minimize a loss function based on (i) a measure of photometric loss between the second input image frame and the projected image frame, (ii) a measure of total variance in the upsampled depth map, and (iii) a measure of errors between edges in an extracted guidance map that identifies the one or more regions of the first or second input image frame and edges identified in the upsampled depth map.

15. A non-transitory computer readable medium containing instructions that when executed cause at least one processor to:
obtain an input image frame and a coarse depth map associated with the input image frame, the coarse depth map having a first resolution;
identify regions of the input image frame containing redundant information; and
perform an image processing task using the input image frame and guidance based on the identified regions of the input image frame;
wherein different ones of the identified regions of the input image frame are associated with different depths or depth ranges within a scene; and
wherein the instructions that when executed cause the at least one processor to perform the image processing task comprise instructions that when executed cause the at least one processor to generate, based on the identified regions of the input image frame, a refined depth map having a second resolution higher than the first resolution.

16. The non-transitory computer readable medium of claim 15, wherein the input image frame has the second resolution.

17. The non-transitory computer readable medium of claim 15, wherein:
the instructions that when executed cause the at least one processor to identify the regions of the input image frame comprise instructions that when executed cause the at least one processor to generate an extracted guidance map that identifies the regions of the input image frame; and
the instructions that when executed cause the at least one processor to generate the refined depth map comprise instructions that when executed cause the at least one processor to minimize a loss function based on the extracted guidance map.

18. A non-transitory computer readable medium containing instructions that when executed cause at least one processor to:
obtain a first input image frame associated with a first image plane, a second input image frame associated with a second image plane, and a coarse depth map associated with at least one of the first and second input image frames;
identify one or more regions of the first or second input image frame containing redundant information; and
perform an image processing task using the first and second input image frames and guidance based on the one or more identified regions of the first or second input image frame;
wherein the instructions that when executed cause the at least one processor to perform the image processing task comprise instructions that when executed cause the at least one processor to:
upsample the coarse depth map to produce an upsampled depth map; and
refine the upsampled depth map with the guidance based on the one or more identified regions of the first or second input image frame to produce a refined depth map; and wherein the instructions that when executed cause the at least one processor to refine the upsampled depth map to produce the refined depth map comprise instructions that when executed cause the at least one processor to:
project the first input image frame to the second image plane in order to produce a projected image frame using (i) the upsampled depth map and (ii) rotation and translation information identifying a conversion from the first image plane to the second image plane; and
adjust at least one of the upsampled depth map and the rotation and translation information.

19. The non-transitory computer readable medium of claim 18, wherein the instructions that when executed cause the at least one processor to project the first input image frame to the second image plane comprise instructions that when executed cause the at least one processor to:
convert the upsampled depth map from a coordinate frame associated with the first image plane to a coordinate frame associated with the second image plane using the rotation and translation information in order to produce a converted depth map; and
project the first input image frame to the second image plane using the converted depth map.

20. The non-transitory computer readable medium of claim 18, wherein the instructions that when executed cause the at least one processor to adjust at least one of the upsampled depth map and the rotation and translation information comprise:
instructions that when executed cause the at least one processor to minimize a loss function based on (i) a measure of photometric loss between the second input image frame and the projected image frame, (ii) a measure of total variance in the upsampled depth map, and (iii) a measure of errors between edges in an extracted guidance map that identifies the one or more regions of the first or second input image frame and edges identified in the upsampled depth map.

* * * * *